Figure 1:
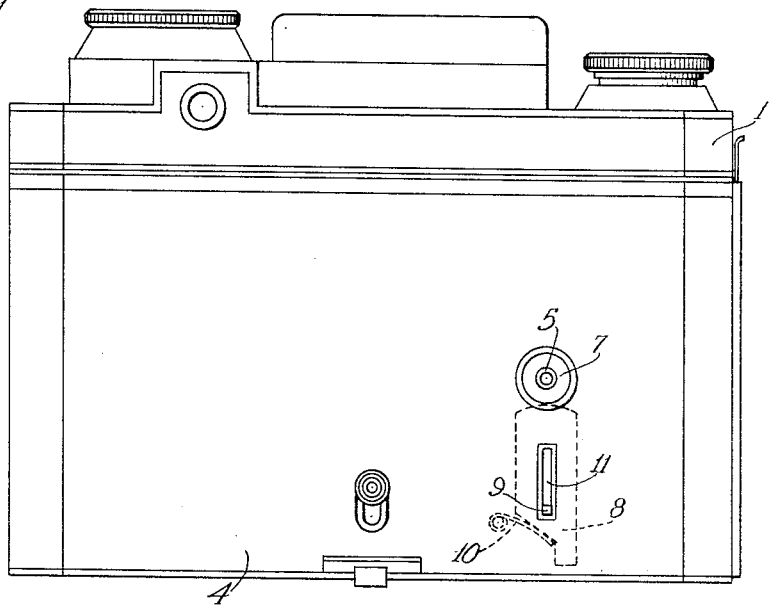

Nov. 30, 1943.   H. KÜPPENBENDER ET AL   2,335,426
ROLLFILM CAMERA
Filed Oct. 6, 1939

Inventors:
Heinz Küppenbender
Heinrich Eyth
Eugen Jörg
By Singer, Ehlert, Stern & Carlberg
Attorneys Patented Nov. 30, 1943

2,335,426

UNITED STATES PATENT OFFICE 2,335,426

ROLL-FILM CAMERA

Heinz Küppenbender, Dresden, and Heinrich Eyth and Eugen Jörg, Stuttgart, Germany; vested in the Alien Property Custodian Application October 6, 1939, Serial No. 298,228
In Germany November 18, 1938

1 Claim. (Cl. 95—31)

The invention relates to improvements in roll-film cameras and particularly is directed to roll-film cameras in which the film advancement is controlled by an automatic locking device. In cameras of the type mentioned it is impossible to determine from the exterior whether the camera is loaded with a film, because there is not provided any means, as for instance a window in the rear wall of the camera casing, which would permit the photographer to detect the presence of a film in the camera.

The principal object of the invention is to overcome this disadvantage of the cameras mentioned by providing an interior portion of the camera casing, which interior portion is covered by a film in the camera, with a mark or sign, which is visible through a special observation window in the rear wall of the camera, provided there is no film in the camera casing.

Another object of the invention is to provide the observation window in the rear wall of the camera casing with a slidable closure member which normally is urged by spring pressure in a position in which the window is closed.

Still another object of the invention is to arrange the mark or sign, adapted to be visible through said observation window when there is no film in the camera, on the frame member which is positioned in the focal plane and surrounds the picture window of the camera. The mark or sign may consist of a white circle or a white cross, so as to be readily distinguishable through the window which is suitably colored to protect the light sensitive layer or the film, as is well understood in the art.

Other objects of the invention will be apparent from the following description with reference to the accompanying drawing which illustrates by way of example one embodiment of the invention.

Figure 2:
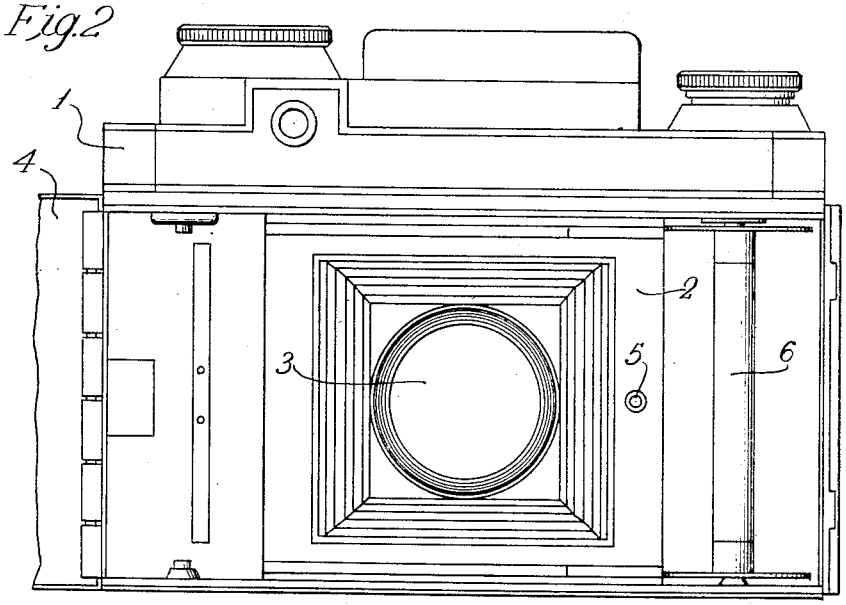

In the drawing:

Fig. 1 is a rear elevation view of a roll-film camera and illustrates the observation window and the slidable closure member for the same, and Fig. 2 is a rear elevation view of the camera with the rear cover opened.

Referring to Fig. 2, the picture window of the camera 1 is formed by the rectangular opening in the frame 2 which is arranged in the focal plane of the camera objective 3. When the rear cover 4 of the camera is closed the customary pressure plate (not shown) on the rear cover 4 presses the film flat and uniformly against the frame 2. In accordance with the invention the frame 2 is provided on one of its transverse portions with a mark or sign 5 consisting for instance of a white circle or a white cross. This mark 5 may be arranged also on any other portion of the frame 2 or any other interior part of the camera casing, as long as it is covered by a portion of the rollfilm which travels from the supply spool to the take-up spool 6.

According to Fig. 1 the rear cover 4 of the camera 1 is provided with a colored window 7 through which the mark 5 is visible when the cover 4 is closed and there is no film in the camera. When a film is in the camera and extends over the picture aperture it obviously covers the mark 5. The window 7, of course, is light-proof and is suitably colored to protect the light sensitive layer on the film against exposure by light entering through the window 7.

Preferably, the window 7 is normally closed by an opaque cover plate 8 slidably mounted in a light-proof manner on the rear cover 4 and urged into closing position by a spring 10. A handle or knob 9 extends outwardly from the cover plate 8 and through a slot 11 in the cover 4, so that the cover plate 8 may be manually opened from the outside of the closed camera by moving the handle 9 against the tension of the spring 10.

What we claim is:

In a rollfilm camera having a casing, a rear cover for the casing, said cover being adapted to be opened for loading the camera with a film, and a picture window frame carried within the casing adjacent said cover and in alignment with an objective of the camera, the film passing over said frame when the camera is loaded to make exposures, the combination of means for visually indicating when the camera is loaded, comprising a white indicating mark fixed on said frame, said cover having a window therein which is aligned with said indicating mark when the cover is in position to close the casing whereby the indicating mark may be viewed by an observer when the camera is in an unloaded condition, a plate movable over said window and slidably carried on said cover and resilient means normally urging said plate into a position to cover said window.

HEINZ KÜPPENBENDER.
HEINRICH EYTH.
EUGEN JÖRG.